United States Patent
Lange et al.

(10) Patent No.: US 12,412,579 B2
(45) Date of Patent: Sep. 9, 2025

(54) AUTOMATED ASSISTANT FOR INTRODUCING OR CONTROLLING SEARCH FILTER PARAMETERS AT A SEPARATE APPLICATION

(71) Applicant: GOOGLE LLC, Mountain View, CA (US)

(72) Inventors: Joseph Lange, Zurich (CH); Marcin Nowak-Przygodzki, Bäch (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/382,353

(22) Filed: Oct. 20, 2023

(65) Prior Publication Data

US 2024/0046929 A1    Feb. 8, 2024

Related U.S. Application Data

(63) Continuation of application No. 17/235,104, filed on Apr. 20, 2021, now Pat. No. 11,830,487.

(51) Int. Cl.
*G10L 15/00* (2013.01)
*G10L 15/22* (2006.01)

(52) U.S. Cl.
CPC .................................. *G10L 15/22* (2013.01)

(58) Field of Classification Search
CPC ..... G06F 16/9535; G06F 16/243; G10L 15/22
See application file for complete search history.

(56) References Cited

U.S. PATENT DOCUMENTS 9,875,740 B1    1/2018  Kumar et al.
10,558,693 B1 *  2/2020  Elieson .............. G06Q 30/0623
(Continued)

FOREIGN PATENT DOCUMENTS

JP      2008089625     4/2008
JP      2009266129     11/2009
(Continued)

OTHER PUBLICATIONS

European Patent Office; International Search Report and Written Opinion issued in Application No. PCT/US2021/063635; 11 pages; dated May 9, 2022.
(Continued)

*Primary Examiner* — Daniel Abebe
(74) *Attorney, Agent, or Firm* — Gray Ice Higdon

(57) ABSTRACT

Implementations set forth herein relate to an automated assistant that can operate as an interface between a user and a separate application to search application content of the separate application. The automated assistant can interact with existing search filter features of another application and can also adapt in circumstances when certain filter parameters are not directly controllable at a search interface of the application. For instance, when a user requests that a search operation be performed using certain terms, those terms may refer to content filters that may not be available at a search interface of the application. However, the automated assistant can generate an assistant input based on those content filters in order to ensure that any resulting search results will be filtered accordingly. The assistant input can then be submitted into a search field of the application and a search operation can be executed.

20 Claims, 7 Drawing Sheets

(56) References Cited

U.S. PATENT DOCUMENTS

| | | | |
|---|---|---|---|
| 11,276,393 B2* | 3/2022 | Lu | G06F 16/3329 |
| 11,361,373 B1* | 6/2022 | Warren | G06F 16/9535 |
| 2010/0281417 A1 | 11/2010 | Yolleck | |
| 2014/0108453 A1 | 4/2014 | Venkataraman et al. | |
| 2014/0172821 A1 | 6/2014 | Hu | |
| 2016/0092159 A1 | 3/2016 | Chen et al. | |
| 2019/0205444 A1 | 7/2019 | Yazdani et al. | |
| 2020/0152172 A1 | 5/2020 | Yoo | |
| 2020/0342029 A1* | 10/2020 | Piecko | G06F 16/9035 |
| 2020/0356339 A1 | 11/2020 | Krishnan et al. | |
| 2022/0236864 A1 | 7/2022 | Roberts | |

FOREIGN PATENT DOCUMENTS

| | | |
|---|---|---|
| JP | 2014106927 | 6/2014 |
| JP | 2016502696 | 1/2016 |
| JP | 2017058599 | 3/2017 |
| JP | 2020177549 | 10/2020 |

OTHER PUBLICATIONS

Rastogi A. et al.; Towards Scalable Multi-domain Conversational Agents: The Schema-guided Dialogue Dataset; 8 pages; date Sep. 12, 2019.

European Patent Office; Communication pursuant to Article 94(3) EPC issued in Application No. 21841139.5; 8 pages; dated Dec. 9, 2024.

Japanese Patent Office; Notice of Reasons for Rejections issued in Application No. 2023-537160; 14 pages; dated Sep. 17, 2024.

Japanese Patent Office; Decision of Refusal issued in Application No. 2023-537160; 8 pages; dated Feb. 12, 2025.

Intellectual Property India; Examination Report issued in Application No. 202327038472; 7 pages; dated Apr. 4, 2025.

* cited by examiner

AUTOMATED ASSISTANT FOR INTRODUCING OR CONTROLLING SEARCH FILTER PARAMETERS AT A SEPARATE APPLICATION

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input.

For example, a user that invokes their automated assistant to perform a search operation via a particular application may be limited by whether the particular application has enabled features for interfacing with the automated assistant. Depending on whether the automated assistant is able to control certain features of the application, the automated assistant may only fulfill a limited number of requests from the user. In such instances, the user may necessarily be tasked with individually identifying the fulfilled requests and unfulfilled requests, and then subsequently interacting with the touch interface in order to manually complete any unfulfilled requests. Switching between interfaces in this way can consume resources across many facets of a computing device and can increase a likelihood that inaccurate search results will be provided by the application and/or the automated assistant.

SUMMARY

Implementations set forth herein relate to an automated assistant that allows a user to search and/or filter application content of an application (e.g., a website, client application, server application, browser, etc.) by providing a spoken utterance to the automated assistant and without the user providing direct inputs to the application. A search operation can be initialized when a user requests the automated assistant to access an application and search for application content. In response to such a request from the user, the automated assistant can determine whether the application identified by the user provides any features for filtering search results, apart from a search field. The automated assistant can determine whether a search interface of the application includes one or more selectable graphical user interface (GUI) elements for limiting a type of content that will be included in the search results. When the automated assistant determines that the application interface includes one or more selectable filter elements corresponding to one or more terms in an assistant input from the user, the automated assistant can adjust the one or more filter elements according to the one or more terms. The automated assistant can then populate a search field of the application interface with one or more other terms identified in the assistant input and initialize a search operation.

When the search operation is initialized, the application can search for application content related to the one or more terms in the search field. As a result, the user would receive search results from the application without having directly interacted with the application to search for application content. Rather, the user has relied on the automated assistant to perform natural language understanding (NLU) and/or speech to text processing in order to interact with the application in accordance with the request from the user. In this way, the user can reduce an amount of time spent attempting to identify certain filter elements at an application interface and/or manually typing search terms into a search field of the application interface.

In some implementations, the search results provided by the application can be further filtered by the automated assistant in response to another request from the user to the automated assistant. For example, subsequent to the user causing the automated assistant to interact with the application to provide the search results, the user can provide an additional spoken utterance to the automated assistant. The spoken utterance can identify one or more additional search terms that can be used by the automated assistant to tilter the search results and/or otherwise select a subset of the search results. For example, in response to receiving the additional spoken utterance, the automated assistant can determine whether any additional search terms embodied in the additional spoken utterance correspond to one or more selectable filter elements rendered at a search results interface of the application. When the automated assistant determines that the additional search terms do not correspond to one or more selectable filter elements of the application, the automated assistant can generate a search command to be executed by the application. The search command can be generated to ensure that the application will provide a subset of the search results, instead of resetting any established search parameters that were used to generate the search results and/or instead of starting a new search from a null state.

In some implementations, the user can provide, to the automated assistant, a search request that includes parameters regarding when to provide any search result content to the user. For example, a user can provide a search request for searching content of an application (e.g., a news application) and also specify a subsequent time at which the user would like the search results to be provided to the user (e.g., "Assistant, search my News Application for block chain articles from yesterday and read them to me at 10:00 AM."). In this way, when the automated assistant is operating on an ecosystem of devices, the automated assistant can search for and/or download any relevant search results at a device that the user may be accessing at the specified time. This can also allow the automated assistant to select a reliable network for retrieving the search results—rather than immediately downloading content from whatever network is available at the time the user is requesting to receive the resulting content.

The above description is provided as an overview of some implementations of the present disclosure. Further description of those implementations, and other implementations, are described in more detail below.

Other implementations may include a non-transitory computer-readable storage medium storing instructions executable by one or more processors (e.g., central processing unit(s) (CPU(s)), graphics processing unit(s) (GPU(s)), and/or tensor processing unit(s)(TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
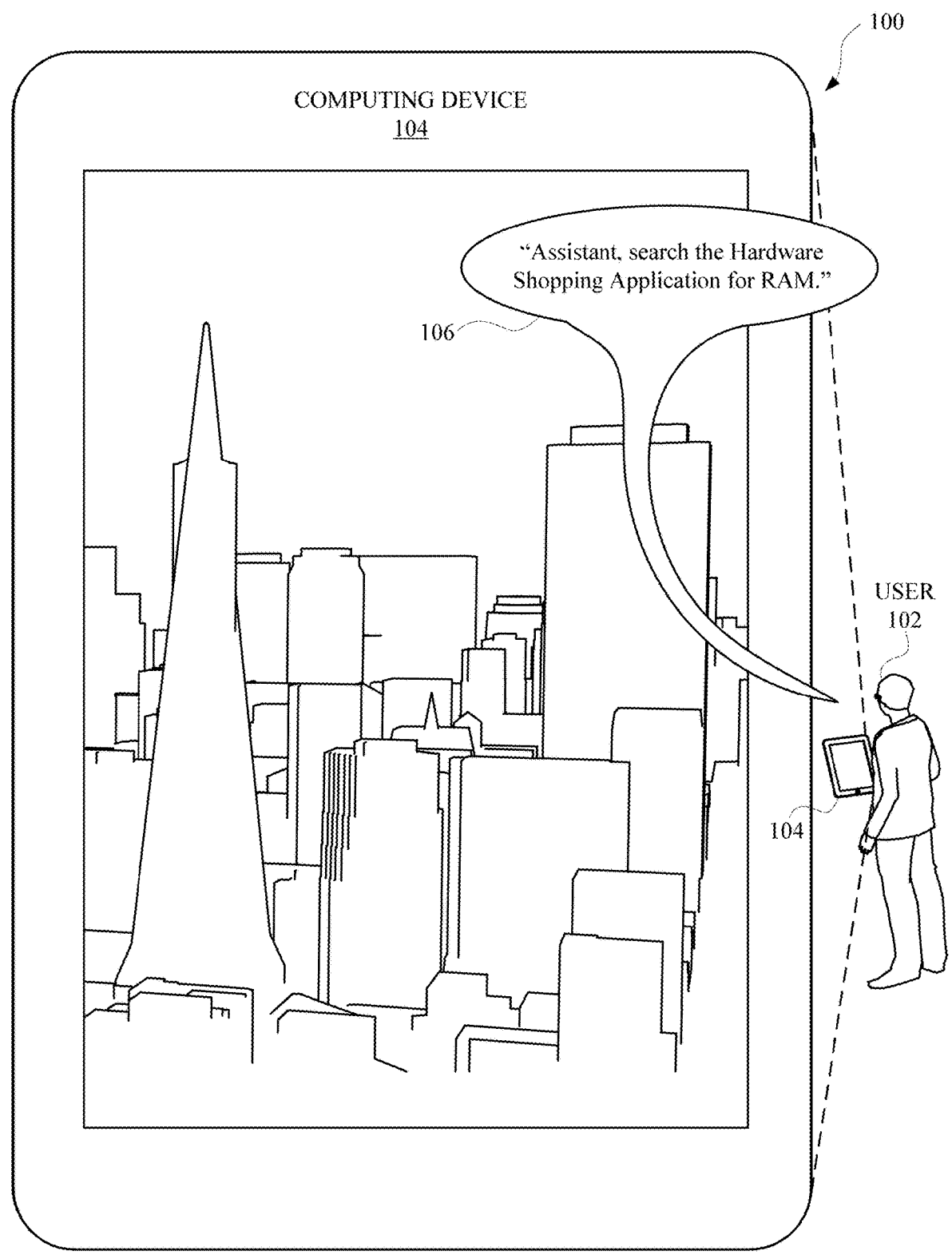
FIG. 1A, FIG. 1B, FIG. 1C, and FIG. 1D illustrate views of a user interacting with an automated assistant in order to control a search operation of an application.
Figure 1B:
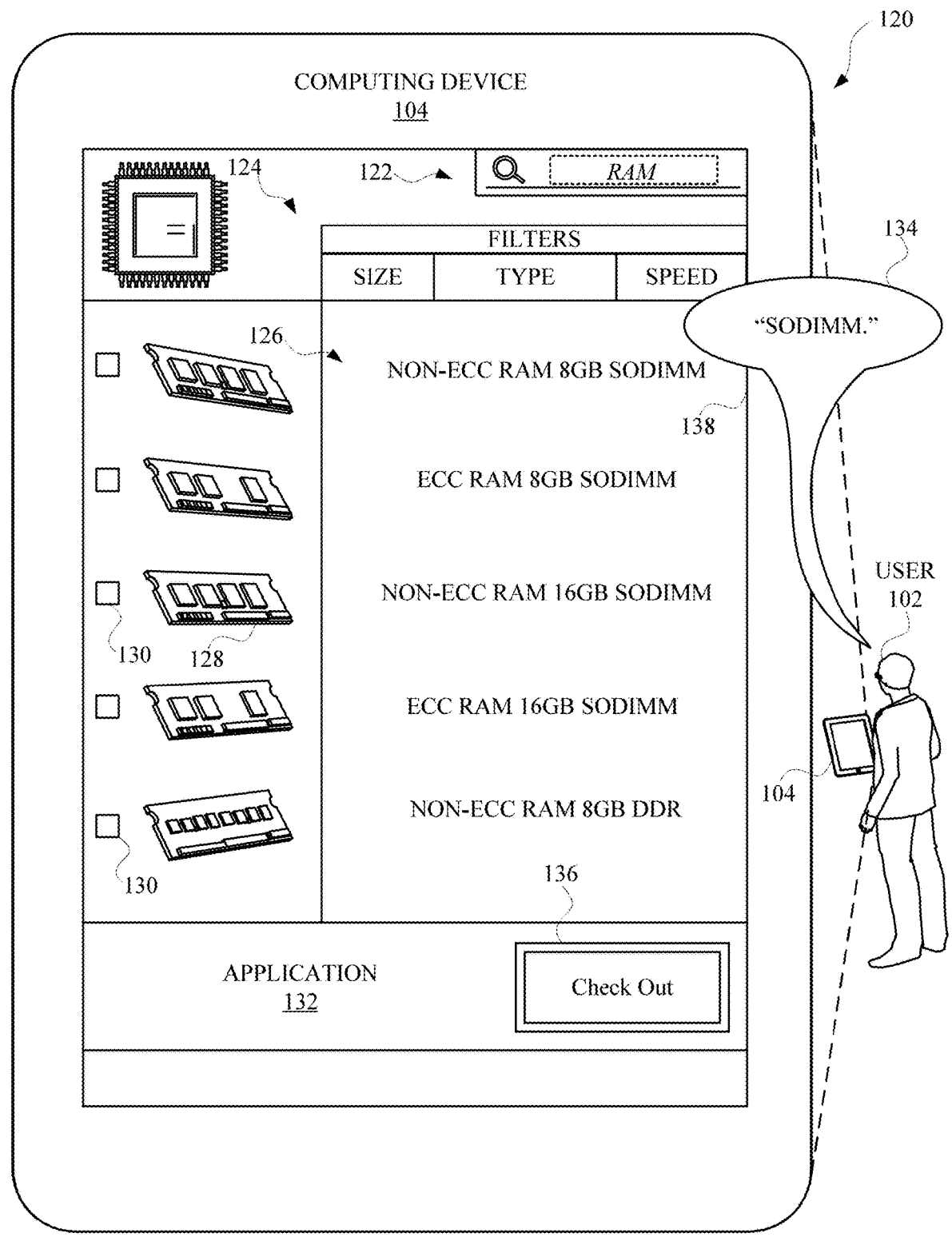

FIG. 1A, FIG. 1B, FIG. 1C, and FIG. 1D illustrate a view 100, a view 120, a view 140, and a view 160 of a user 102 interacting with an automated assistant in order to control a search operation of an application 132. The application 132 can be separate from the automated assistant but can allow the automated assistant to control certain operations of the application 132. For example, the application 132 can be a hardware shopping application that the user 102 can employ in order to buy computer parts. In order to invoke the automated assistant to control the application 132, the user 102 can provide a spoken utterance 106 to an audio interface of a computing device 104. The spoken utterance 106 can be, for example, "Assistant, search the hardware shopping application for RAM." as illustrated in view 100 of FIG. 1A.

In response to the spoken utterance, the automated assistant can initialize the application 132 and cause the application 132 to execute a search operation based on natural language content of the spoken utterance. For example, the term "RAM" can be incorporated into a search field 122 of the application 132 by the automated assistant and cause the application 132 to execute a search based on the term "RAM." As a result, the automated assistant can cause a search results interface 138 to be rendered at a display interface of the computing device 104 in response to the spoken utterance 106. The search results interface 138 at the application 132 can include a list of search results 126, one or more selectable GUI elements 124 for controlling one or more filters, one or more selectable checkboxes 130, one or more image results, and/or one or more other selectable elements 136 for controlling the application 132.

Although the user 102 can manually interact with the display interface at the computing device 104 to further refine the search results 126, the user 102 can alternatively continue to interact with the automated assistant to refine the search results 126. For example, and with prior permission from the user 102, the automated assistant can continue to detect whether the user 102 has provided any input for controlling the application 132. For instance, the user 102 can provide another spoken utterance 134 for filtering the search results 126 according to the content of the other spoken utterance 134. The other spoken utterance 134 can be, for example, "SODIMM," which can refer to a classification of a subset of items listed in the search results 126. In response to the other spoken utterance 134, the automated assistant can determine whether the content of the other spoken utterance 134 includes one or more additional search terms and/or one or more filter parameters.

The automated assistant can determine, for example, that the user has identified a filter parameter of the one or more filters available at the search results interface 138. In some implementations, the automated assistant can identify a correlation between the content of a spoken utterance and a filter parameter of an application based on available assistant data. The assistant data can characterize one or more heuristic processes and/or one or more trained machine learning models that are based on various application interfaces and/or application metadata (e.g., HTML, XML, PHP, etc.) associated with the application 132 and/or a different application(s). Therefore, when a particular filter parameter is identified by a user, the assistant data can be used in order to generate one or more commands for modifying one or more selectable GUI elements according to the particular filter parameter.

In response to the other spoken utterance 134, the automated assistant can interact with the one or more selectable GUI elements 124 in order to enable a filter based on content of the spoken utterance 134. For example, the automated assistant can generate a command that causes the "TYPE" drop down menu to be selected and a RAM type "SODIMM" to be selected, as illustrated in view 140 of FIG. 1C. In response to modifying the selectable GUI element 124 that controls the type of RAM, the application 132 can subsequently render another list of search results 142, and can also include an indication of a filter 146 that was activated via the automated assistant (e.g., SODIMM).

In some implementations, the application 132 that the user 102 is interacting with may not include certain filters for controlling one or more filtering operations to filter the search results. Regardless, the automated assistant can be invoked by the user 102 in order to further refine search results according to one or more search parameters, which may not correspond to any selectable GUI elements provided by the application 132. For example, the user 102 can provide an additional spoken utterance 144 such as "non-ECC," which can refer to another classification of memory chips. In response to receiving the additional spoken utterance 144, the automated assistant can determine whether content of the additional spoken utterance 144 includes one or more terms associated with any select elements available at the search results interface 138.

For example, the automated assistant can determine whether any content of the search results interface 138 and/or metadata associated with the application 132 corresponds to a selectable filter that can filter search results 142 according to the term "non-ECC." When the automated assistant determines that one or more terms in the additional spoken utterance 144 are not associated with any available selectable filter of the application 132, the automated assistant can generate search terms 148 in lieu of the application 132 not providing a suitable user-selectable filter. In some implementations, when the automated assistant determines that one or more terms in a spoken utterance are not associated with any available content filter, the automated assistant can identify one or more alphanumeric characters and/or non-alphanumeric characters to incorporate into a search command.

In response to the additional spoken utterance 144, the automated assistant can incorporate one or more search terms 148 into the search field 122 and initialize a search operation via the application 132. The search terms 148 can include one or more search terms from a prior search (e.g., "RAM") requested by the user 102 and one or more additional search terms (e.g., "non-ECC") from a most recent search requested by the user 102. As a result, the application 132 can render filtered search results 162 at the search results interface 138. In some implementations, search terms 148 can remain in the search field 122 in order to put the user 102 on notice of any assistant filters that have been employed by the automated assistant, as provided in view 160 of FIG. 1D.

Figure 1C:
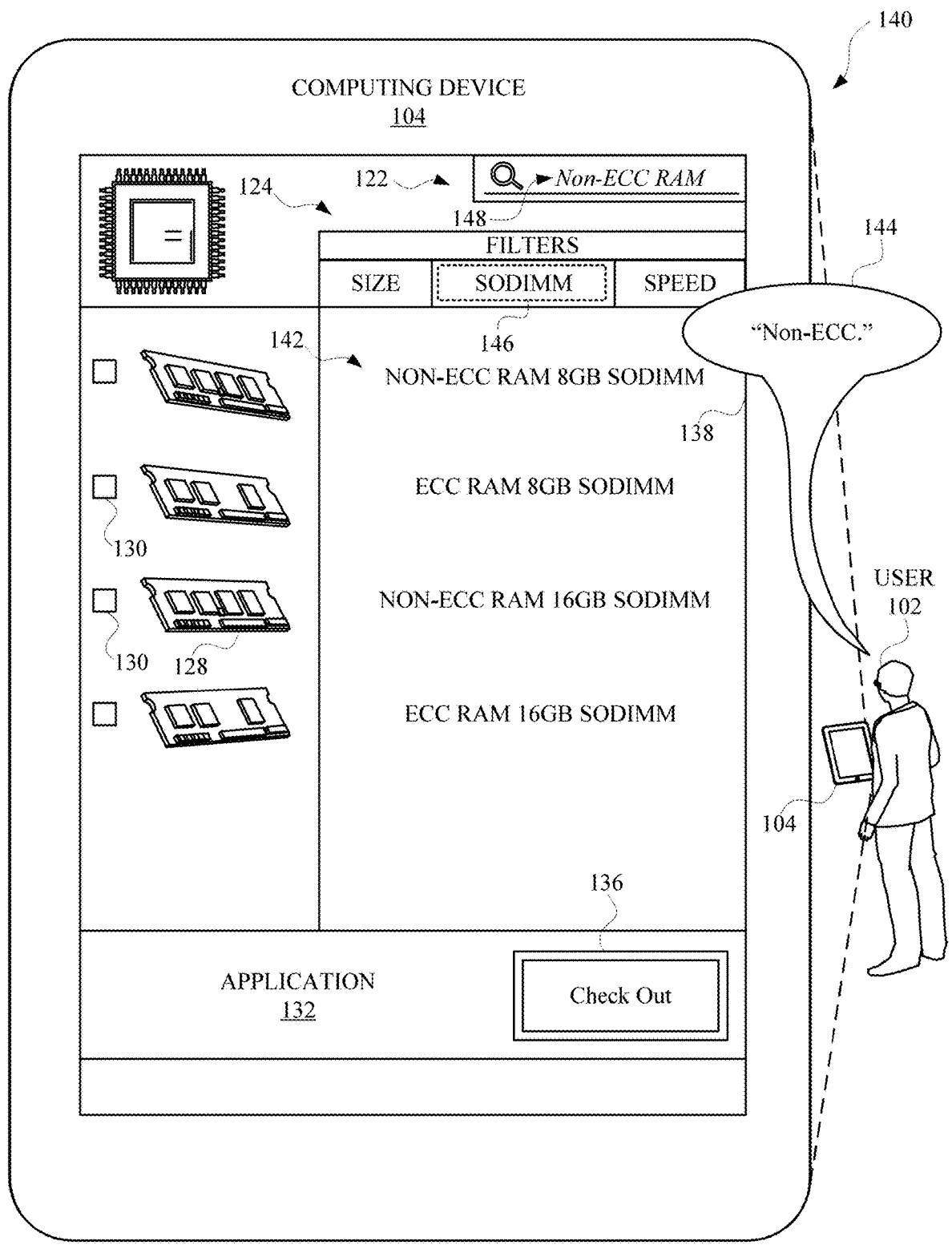
Figure 1D:
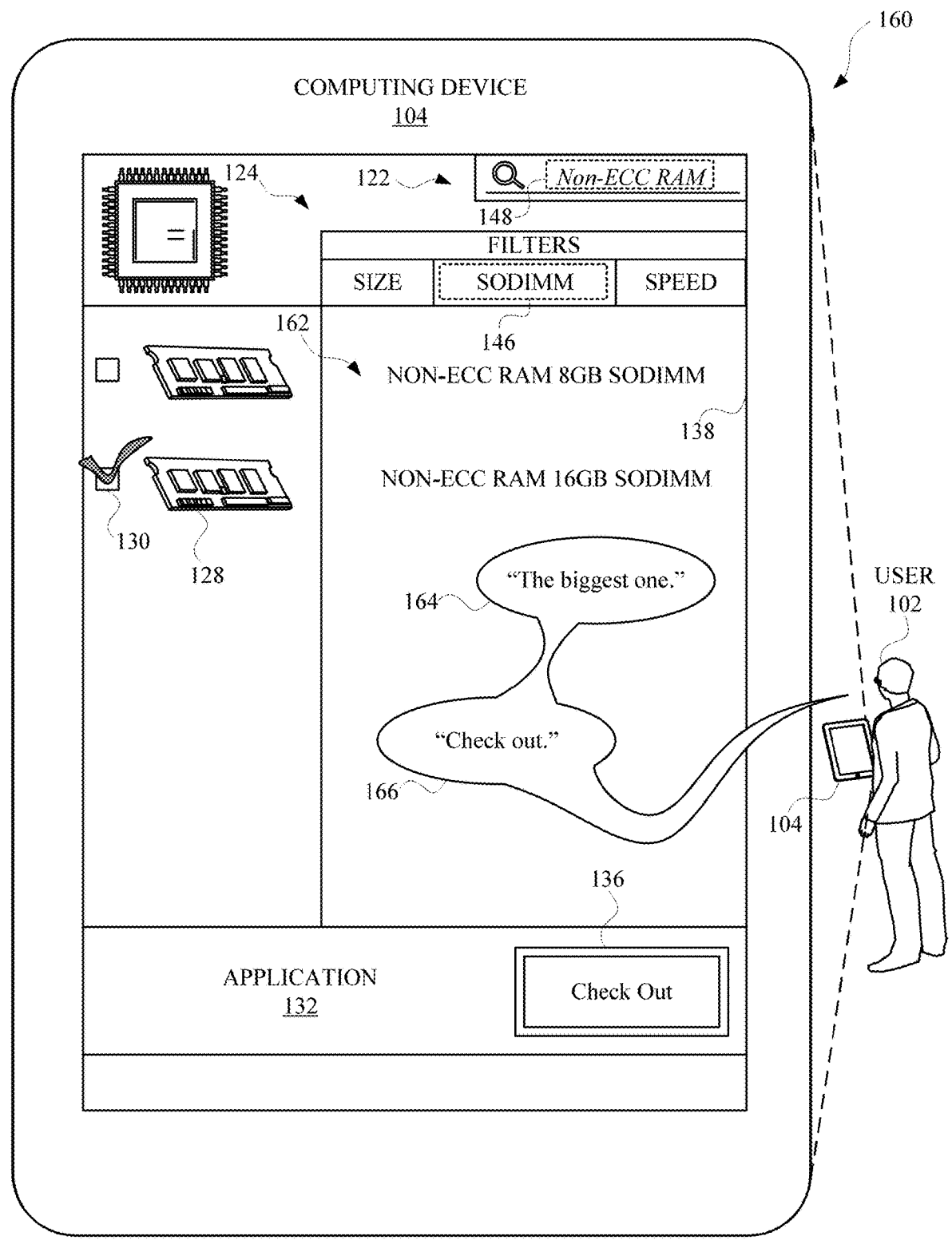

In some implementations, when the user 102 has issued another input for further refining currently available search results (e.g., as illustrated in FIG. 1C), the automated assistant can identify a respective status of each filter of one or more filters available at the application 132. For example, in response to the user 102 providing the spoken utterance 144, the automated assistant can identify a setting of the "TYPE" filter, and generate command data that can be submitted to the application 132 with an assistant input to ensure that the "TYPE" filter has the same status when the subsequent search is performed. For instance, the automated assistant can generate a search command to provide in the search field 148 based on the spoken utterance 144, and when the search command (e.g., "Non-ECC RAM") is executed, the automated assistant can check to determine whether the "TYPE" filter is limited to "SODIMM." When the automated assistant determines that the "TYPE" filter has remain unchanged, the automated assistant may not submit another command. However, when the "TYPE" filter has been reset after executing the search command based on spoken utterance 144, the automated assistant can modify the "TYPE" filter to be limited to "SODIMM." In some implementations, the automated assistant can determine whether the user 102 is requesting to further refine a current set of search results or start a new search from a null state (e.g., with all filters being reset). In some implementations, this determination can be based on content of an assistant input (e.g., whether a spoken utterance includes or omits the term "search") and/or any context that can be associated with a new search or a refining search.

In some implementations, the user 102 can select a particular search result without explicitly identifying a search result and/or by describing another filter parameter to impose on most recent search results 162. For example, a particular search result can be identified based on features of a particular search result compared to other search results. In some implementations, the user 102 can specify visual features and/or natural language content features of a particular search result in order to select a search result for a list of search results. Visual features can, for example, correspond to one or more images 128 being rendered by the application 132 in association with certain search results. Alternatively, or additionally, alphanumeric and/or non-alphanumeric characters of a particular search result can be interpreted by the automated assistant in order to identify any correlation between a particular search result and content of an assistant input provided by the user 102.

For example, the user 102 can provide a spoken utterance such as, "The biggest one," which can refer to a search result of the most recent search results 162 having the largest amount of memory (e.g., 16 GB). In some implementations, each search result can be processed by the automated assistant to generate a respective embedding that can be mapped into latent space. Thereafter, and in response to a subsequent assistant input, the automated assistant can compare an embedding for the assistant input to each respective embedding mapped to the latent space. Alternatively, or additionally, a heuristic process can be executed in order to identify a particular search result that the user may be referring to. For example, spoken utterance 164 can cause the automated assistant to compare one or more terms in each respective search result to each other in order to identify the term that can indicate a size for each search result. When the automated assistant selects the search result that the user 102 is referring to (e.g., by selecting the checkbox 130 for the 16 GB RAM), the user 102 can provide a subsequent spoken utterance 166 (e.g., "Checkout.") in order to continue employing the automated assistant to act as an interface between the user 102 and the application 132.

Figure 2:
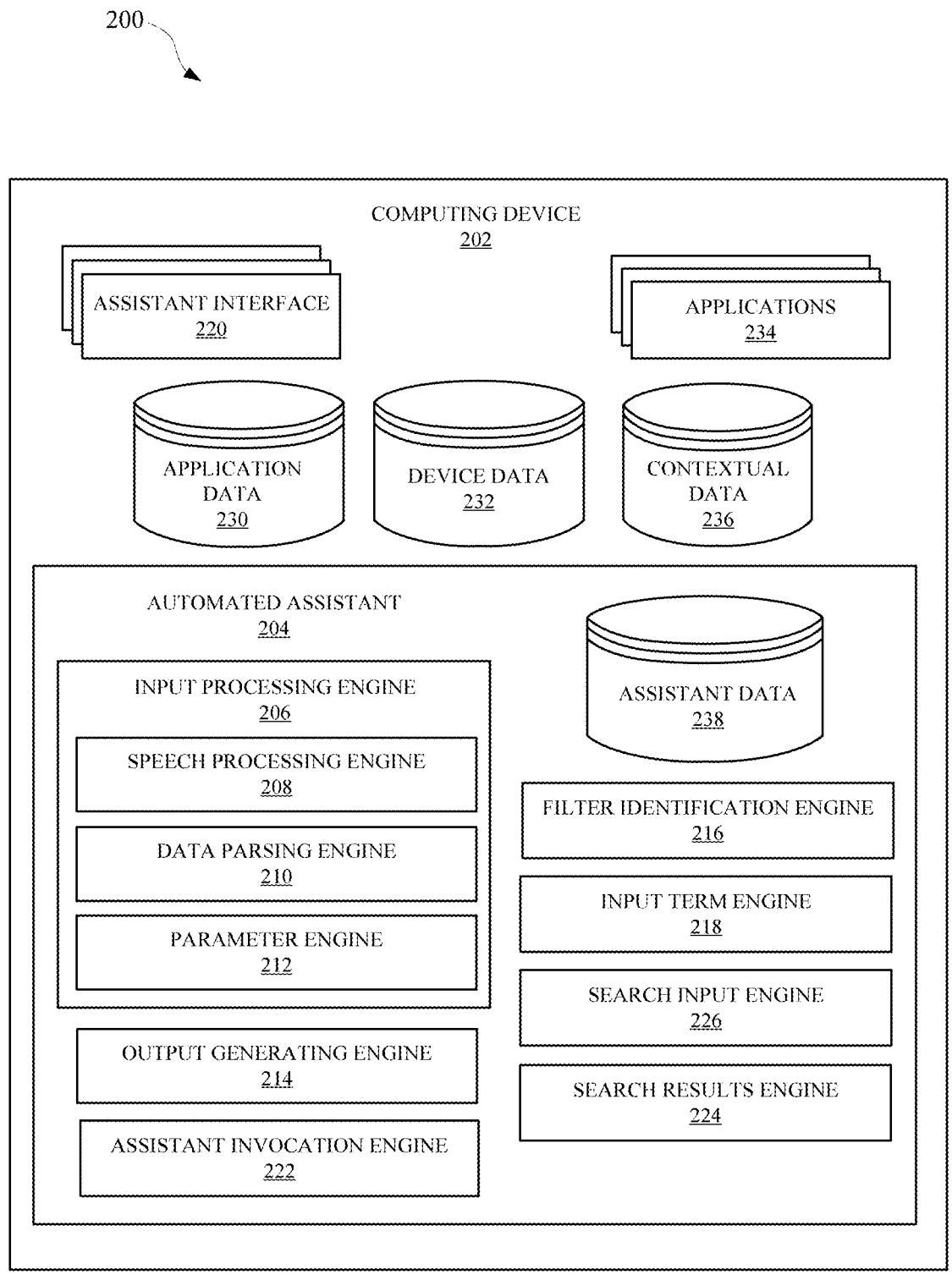
FIG. 2 illustrates a system that provides an automated assistant for controlling a search operation of a separate application to allow search filters to be implemented, regardless of whether the separate application offers express controls for the search filters.

FIG. 2 illustrates a system 200 that provides an automated assistant for controlling a search operation of a separate application to allow search filters to be implemented regardless of whether the separate application offers express controls for the search filters. The automated assistant 204 can operate as part of an assistant application that is provided at one or more computing devices, such as a computing device 202 and/or a server device. A user can interact with the automated assistant 204 via an assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.).

Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third-party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a filter identification engine 216 that processes assistant data 238, which can include the application data 230, device data 232, contextual data 236, and/or any other data, to determine whether an application provides access to one or more filter features and/or how to control one or more filter features. The filter identification engine 216 can process the assistant data 238 in order to determine whether an application 234 executing at the computing device 202 is rendering one or more selectable GUI elements for controlling one or more filter features. In some implementations, the assistant data 238 can be processed according to one or more heuristic processes and/or using one or more trained machine learning models. When one or more filter features are identified for a particular application, the filter identification engine 216 can communicate with an input term engine 218 of the system 200 in order to determine whether an input from a user is associated with the one or more filter features.

For example, the filter identification engine 216 can generate data that characterizes the one or more filter features of an application being accessed by a user, and the automated assistant 204 can compare the data to an input from the user. The user can provide an input, such as a spoken utterance, that includes one or more terms and/or a request for the automated assistant to cause the application to perform a search for certain application content. The automated assistant 204 can compare natural language content of the input to the data from the filter identification engine 216 in order to determine whether content of the input is associated with any of the one or more filter features. When the automated assistant 204 determines that the user has provided a search request that identifies one or more of the filter features, the automated assistant can generate command data to be communicated to the application. The command data that is received by the application can modify one or more filter parameters of the one or more filter features in accordance with the input from the user, and cause the application to execute a search operation.

In some implementations, the input from the user can include terms that may not associated with any filter features of the application—but may nonetheless be intended by the user for filtering search results. As a result, the automated assistant 204 can employ a search input engine 226 in order to determine whether any terms in a user input can be used as a basis for generating a search command (i.e., application input) that can be incorporated into a search field of the application. For example, when the user includes terms for filtering search results (e.g., "Search for RAM manufactured this year"), but the application does not have corresponding filtering features (e.g., no slide bar for limiting manufacturing year), the search input engine 226 can generate a portion of a search command (e.g., "MFR>=2021") to be incorporated into the search field of the application when executing a search operation. Alternatively, or additionally, when the input term engine 218 determines that certain terms of an input can be incorporated into a search command as search terms (e.g., "RAM," "laptop memory," etc.), the search input engine 226 can incorporate such search terms into the search command in combination with any other identified filter parameters (e.g., Search Field: "RAM laptop memory MFR>=2021").

When a search operation is executed at an application via the automated assistant, the application can render certain content as search results. The search results can be rendered at a search results interface of the application, and the search results can be processed by a search results engine 224 of the system 224. The search results engine 224 can generate further data based on the search results in order to determine whether any subsequent input (e.g., a user input provided while the search results are being rendered in a foreground of the computing device 202) is associated with the search results. The search results engine 224 can process data that includes, but is not limited to, screen shots, metadata, source code, and/or any other data that can be associated with a search results interface. In some implementations, the search results engine 224 can generate training data for further training one or more trained machine learning models to cause more accurate search results to be rendered in response to a request from a user to execute a search operation. For example, weighting of terms and/or embeddings can be modified in order to adapt a particular trained machine learning model to be more reliable when employed for processing search terms and/or filter parameters specified by the user. For instance, weighting of terms for a first application can be different than another weighting of those terms for a second application, at least based on how reliably the respective terms produce results that are relevant to a search request from a user.

Figure 3:
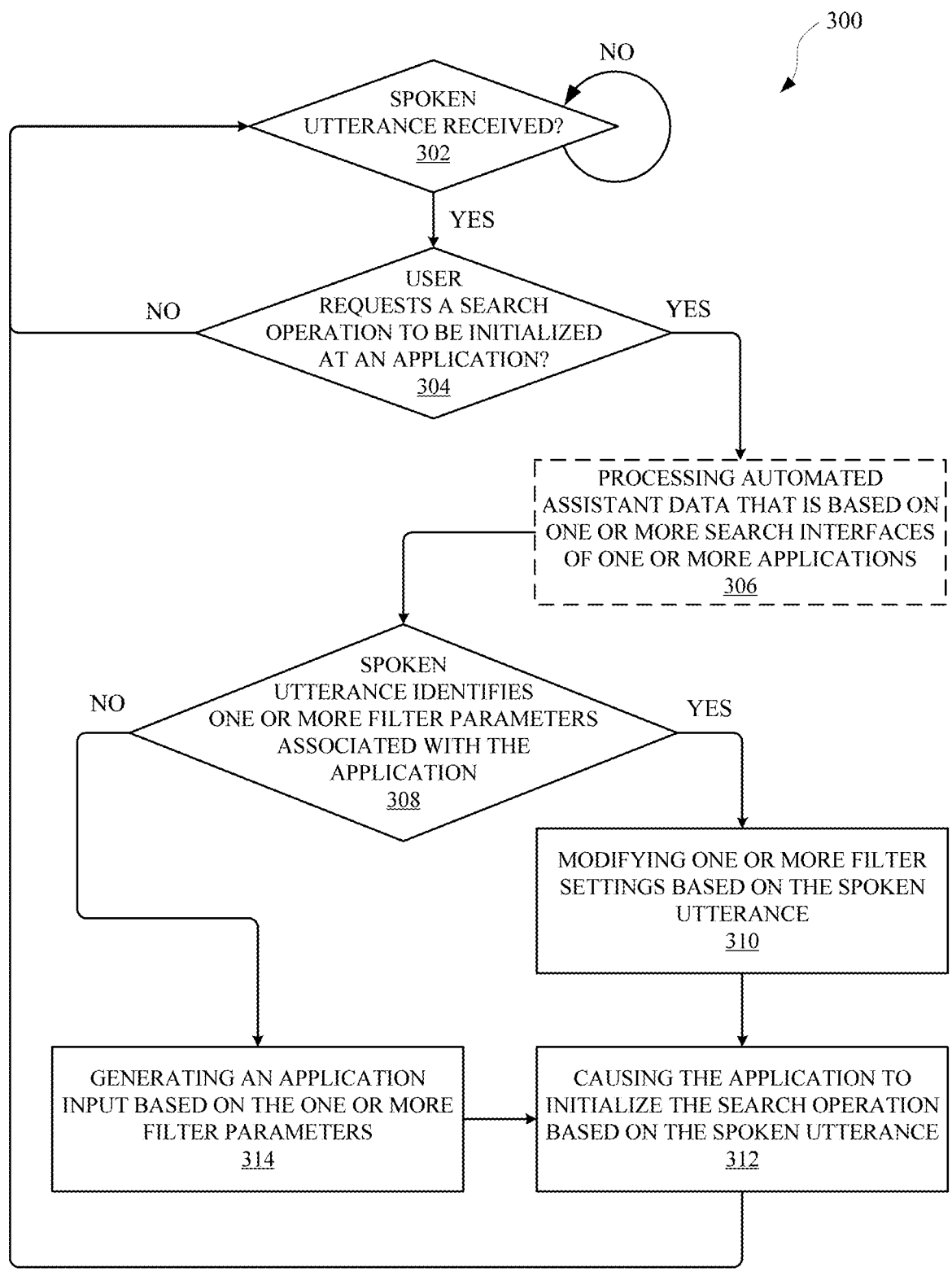
FIG. 3 illustrates a method for operating an automated assistant to interface with a separate application in order to search and/or filter certain application content.

FIG. 3 illustrates a method 300 for operating an automated assistant to interface with a separate application in order to search and/or filter certain application content. The method 300 can be performed by one or more applications, devices, and/or any other apparatus or module capable of interacting with an automated assistant. The method 300 can include an operation 302 of determining whether a spoken utterance has been received by an automated assistant. For example, the spoken utterance can be a request for the automated assistant to access an encyclopedia application in order to identify certain articles (e.g., "Assistant, search my encyclopedia application for cryptography articles written this year."). In response to receiving the spoken utterance, the automated assistant can process audio data in order to identify one or more requests embodied in the spoken utterance.

The method 300 can proceed from the operation 302 to an operation 304, which can include determining whether the user is requesting a search operation to be initialized at another application. Otherwise, when no spoken utterance is received, the automated assistant can continue to detect assistant inputs. A request for a search operation to be initialized can specify the application that the user wishes to employ, in combination with the automated assistant, in order to search for certain application content. Alternatively, or additionally, the request for the search operation can identify one or more terms that should be used in order to identify certain application content. When the user is determined to have requested a search operation be initialized at another application, the method 300 can proceed from the operation 304 to an optional operation 306. Otherwise, the method 300 can return to the operation 302 for detecting assistant inputs from one or more users.

The optional operation 306 can include processing automated assistant data that is based on one or more search interfaces of one or more applications. For example, the assistant data can characterize one or more heuristic processes and/or one or more machine learning models that can be used to process data that is based on the search interface of the application. In response to the spoken utterance, the automated assistant can initialize the application in order for a search interface of the application to be rendered at a display interface of the computing device. The assistant data can be processed in order to determine whether certain features of the search interface can be controlled by the automated assistant. For example, the search interface may include a search field for providing search terms and/or other characters for defining a search operation to be executed by the application. Alternatively, or additionally, the search interface may include one or more selectable GUI elements for establishing filter settings for the search operation.

The method 300 can proceed from the optional operation 306 to an operation 308 for determining whether the spoken utterance identifies one or more filter parameters associated with the application. For example, the assistant data can be processed with the audio data of the input in order to determine whether them is any correlation between natural language content of the spoken utterance and one or more filter parameters associated with the application. In accordance with the previous example, the automated assistant can determine that the search interface of the application includes a filter parameter for filtering encyclopedia articles published before a particular date. When the automated assistant determines that the spoken utterance identifies one or more filter parameters, the method 300 can proceed from the operation 308 to an operation 310. Otherwise, the method 300 can proceed from the operation 308 to an operation 314.

The operation 310 can include modifying one or more filter settings based on the spoken utterance. For example, the spoken utterance can embody one or more filter parameters specified by the user in order for the automated assistant to modify one or more filters of the application accordingly. In some instances, the user can identify one or more filter parameters that correspond to one or more selectable GUI elements, such as one or more checkboxes and/or one or more dials. The automated assistant can determine, based on the one or more filter parameters identified by the user, how to modify the one or more selectable GUI elements in order to execute the search operation in accordance with the request from the user. For example, when the user requests that the automated assistant search an encyclopedia application for articles published after a particular year, the automated assistant can adjust a dial selectable GUI element that controls a date of publication filter. The method 300 can then proceed from the operation 310 to an operation 312, which can include causing the application to initialize the search operation based on the spoken utterance. As a result, the executed search operation can be initialized using filter parameters specified by the user and implemented by the automated assistant, without the user having to manually interact with the display interface in order to activate certain filters. Alternatively, or additionally, the search operation can be initialized with one more search terms identified in the spoken utterance and incorporated into a search field of the search interface of the application.

In some implementations, when the spoken utterance identifies one or more filter parameters that may not be associated with the application or otherwise available at the search interface of the application, the method 300 can proceed from the operation 308 to the operation 314. The operation 314 can include generating an application input based on the one or more filter parameters. The application input can be, for example, a search command comprising alphanumeric characters and/or non-alphanumeric characters that can be provided into a search field of the application for executing a search operation. In some implementations, when a filter parameter is identified by the user but not available at the search interface, the automated assistant can identify one or more special characters (e.g., non-alphanumeric characters). For example, when the search interface does not include a selectable GUI element for limiting search results associated with a particular time, the automated assistant can identify one or more special characters and/or equations (e.g., >, <, >=, <=, etc.) that can be used to filter out certain search results that may not be associated with a particular time range (e.g., "cryptography<=1 year"). In this way, the user can perform such searches as a single input to the automated assistant, rather than waiting for the search results to appear and subsequently adjusting any filters that may or may not be available at a search results interface.

Figure 4:
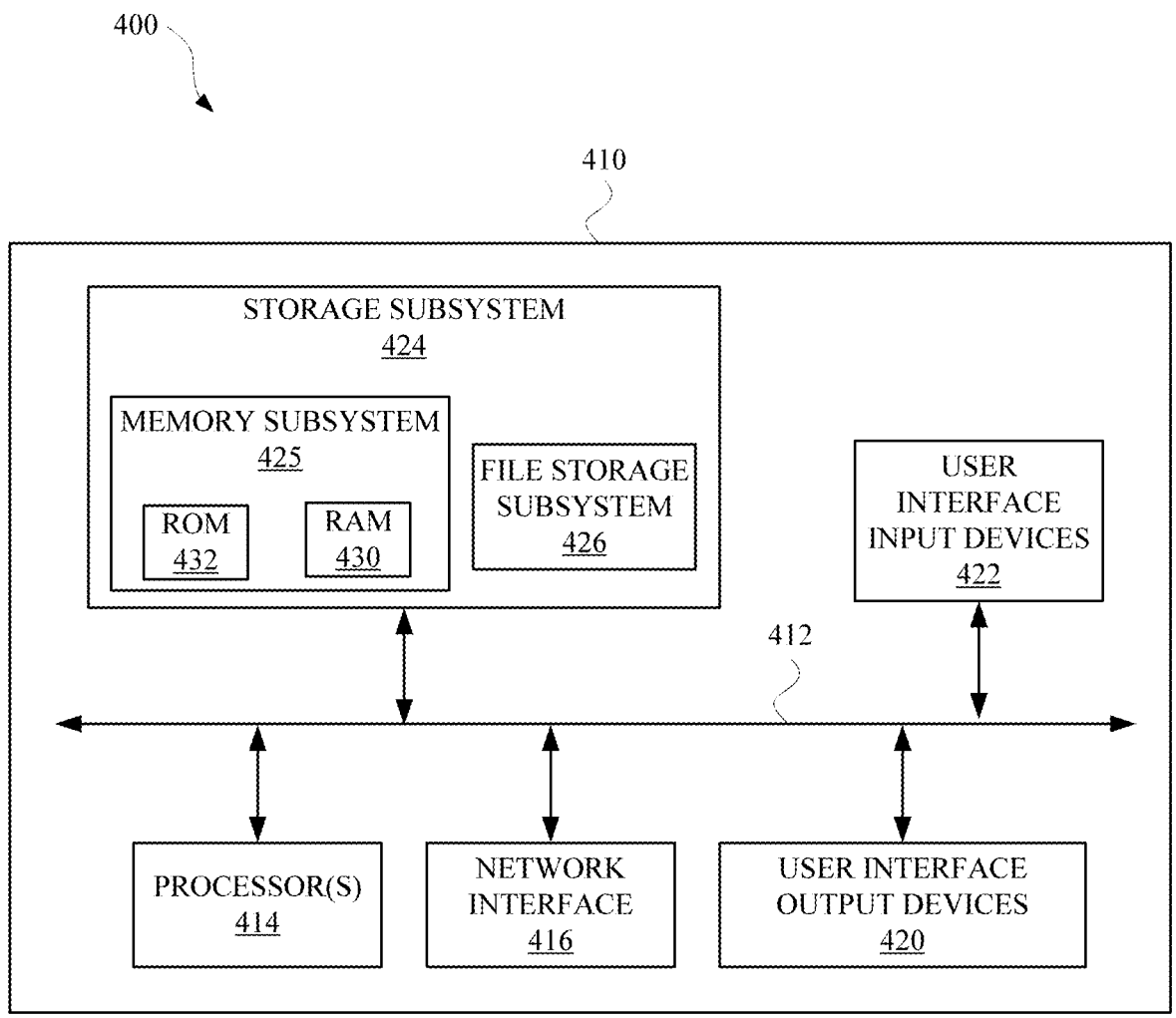
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read-only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at a computing device and from a user, a spoken utterance that is directed to an automated assistant that is accessible via the computing device, wherein the computing device includes a display interface that is rendering a search results interface of an application when the spoken utterance is received. The method can further include an operation of determining, based on the spoken utterance, whether the user identified a particular filter setting that is not included in one or more filter settings of the search results interface. The method can further include an operation of, when the automated assistant determines that the user identified the particular filter setting that is not included in the one or more filter settings: generating an application input that is based on application content of the search results interface and the spoken utterance, and causing the application to initialize performance of a search operation based on the application input.

In some implementations, the application input identifies the particular filter setting and one or more search terms that correspond to the application content being rendered at the search results interface. In some implementations, the application input includes one or more terms included in the spoken utterance, and one or more search terms previously submitted to the application to cause the application content to be rendered at the search results interface. In some implementations, the method can further include an operation of, when the automated assistant determines that the user identified the particular filter setting that is included in the one or more filter settings: causing the particular filter setting of the application to be modified according to the spoken utterance from the user, wherein modifying the particular filter setting causes different application content to be rendered at the search results interface. In some implementations, causing the application to initialize performance of the search operation based on the application input includes: incorporating the application input into a search field of the search results interface.

In some implementations, determining whether the user identified the particular filter setting that is not included in the one or more filter settings of the search results interface includes: processing assistant data that is based on one or more search interfaces previously rendered by the application or a different application. In some implementations, the method can further include an operation of, when the automated assistant determines that the user identified the particular filter setting that is not included in the one or more filter settings: determining a respective status of each filter setting of the one or more filter settings of the search results interface, wherein the application input is further based on each respective status of each filter setting of the one or more filter settings of the search results interface. In some implementations, causing the application to initialize performance of the search operation based on the application input includes: causing the application to render a subset of application content that has been filtered according to each respective status of each filter setting of the one or more filter settings.

In other implementations, a method implemented by one or more processors is set forth as including operations such as receiving, at a computing device, a spoken utterance from a user in furtherance of causing an automated assistant to initialize a search operation using an application that is separate from the automated assistant, wherein the spoken utterance identifies one or more terms. The method can further include an operation of determining, based on the spoken utterance, whether the one or more terms of the spoken utterance is associated with one or more selectable graphical user interface (GUI) elements rendered at an interface of the application, wherein the one or more selectable GUI elements control one or more filter parameters of the search feature of the application. The method can further include an operation of, when the one or more terms of the spoken utterance correspond to the one or more selectable GUI elements rendered at the interface of the application: causing one or more particular selectable GUI elements of the one or more selectable GUI elements to control one or more particular filter parameters, and causing the application to initialize the search operation according to the one or more particular filter parameters.

In some implementations, causing the application to initialize the search operation includes: causing a search field of the application to include the one or more terms identified in the spoken utterance, without the search field including the one or more particular filter parameters. In some implementations, the method can further include an operation of, when the one or more terms of the spoken utterance do not correspond to the one or more selectable GUI elements rendered at the interface of the application: generating an application input that characterizes the one or more particular filter parameters, and causing the application to initialize the search operation using the application input. In some implementations, causing the application to initialize the search operation using the application input includes: causing a search field of the application to include the application input, wherein the application input identifies the one or more particular filter parameters.

In some implementations, the application input includes a non-alphanumeric character that is selected based on the one or more particular filter parameters. In some implementations, the spoken utterance includes a request for the automated assistant to: search for certain content using the application, and subsequently render the certain content for the user. In some implementations, the method can further include an operation of, when the one or more terms of the spoken utterance do not correspond to the one or more selectable GUI elements rendered at the interface of the application: accessing particular application content that satisfies the one or more particular filter parameters, and causing, subsequent to accessing the particular application content, the automated assistant to render audible content that is based on the particular application content.

In some implementations, the method can further include an operation of when the one or more terms of the spoken utterance correspond to the one or more selectable GUI elements rendered at the interface of the application: causing, based on the search operation, multiple different search results to be rendered at another interface of the application, receiving, subsequent to rendering the multiple different search results, an additional spoken utterance from the user, wherein the additional spoken utterance identifies one or more additional terms for identifying a subset of the multiple different search results, and causing, in response to receiving the additional spoken utterance, the multiple different search results to be filtered according to the one or more additional terms. In some implementations, causing the multiple different search results to be filtered according to the one or more additional terms includes: determining that one or more other selectable GUI elements rendered at the other interface correspond to the one or more additional terms, and selecting the one or more other selectable GUI elements according to the one or more additional terms.

In some implementations, a method implemented by one or more processors is set forth as including operation such as receiving, at a computing device, a spoken utterance that includes a request for an automated assistant to perform a search of application content that is accessible via an interface of an application, wherein the spoken utterance identifies one or more terms associated with the application content to be searched. The method can further include an operation of determining, based on the spoken utterance, whether the application provides one or more filtering features for filtering the application content according to the one or more terms identified in the spoken utterance. The method can further include an operation of, when the application is determined to not provide the one or more filtering features: identifying, based on the one or more terms, one or more filter parameters for submitting to the application in furtherance of performing the search of the application content, causing the automated assistant to provide an application input to the application, wherein the application input identifies the one or more filter parameters, and causing, based on the application input, the application to render search results, wherein the search results include a subset of the application content that satisfies the one or more filter parameters.

In some implementations, the one or more filtering features include one or more selectable graphical user interface (GUI) elements that control one or more filtering operations of the application. In some implementations, the method can further include an operation of, when the application is determined to not provide the one or more filtering features: identifying, based on the one or more filter parameters, one or more non-alphanumeric characters that are selected based on the one or more filter parameters, wherein the application input identifies the one or more non-alphanumeric characters.

We claim:

1. A method implemented by one or more processors, the method comprising:
receiving, via one or more microphones of a computing device, a spoken utterance that is directed to an automated assistant that is accessible via the computing device,
wherein the computing device includes a display interface that is rendering a search results interface of an application when the spoken utterance is received from a user and wherein the display interface includes one or more selectable GUI elements which establish one or more filter settings of the search result interface;
determining, based on the spoken utterance, whether the user identified a particular filter setting that is not included in the one or more filter settings of the search results interface; and
when the automated assistant determines, based on the spoken utterance, that the user identified the particular filter setting that is not included in the one or more filter settings of the search result interface:
generating an application input that is based on application content of the search results interface and the spoken utterance, and
causing the application to initialize performance of a search operation based on the application input.

2. The method of claim 1, wherein the application input identifies the particular filter setting and identifies one or more search terms that correspond to the application content being rendered at the search results interface.

3. The method of claim 1, wherein the application input includes one or more terms included in the spoken utterance, and includes one or more search terms previously submitted to the application to cause the application content to be rendered at the search results interface.

4. The method of claim 1, further comprising:
when the automated assistant determines, based on the spoken utterance, that the user identified the particular filter setting that is included in the one or more filter settings:
causing the particular filter setting of the application to be modified according to the spoken utterance from the user,
wherein modifying the particular filter setting causes different application content to be rendered at the search results interface.

5. The method of claim 1, wherein causing the application to initialize performance of the search operation based on the application input includes:
incorporating the application input into a search field of the search results interface.

6. The method of claim 1, wherein determining whether the user identified the particular filter setting that is not included in the one or more filter settings of the search results interface includes:
processing assistant data that is based on one or more search interfaces previously rendered by the application or a different application.

7. The method of claim 1, further comprising:
when the automated assistant determines that the user identified the particular filter setting that is not included in the one or more filter settings:
determining a respective status of each filter setting of the one or more filter settings of the search results interface,
wherein the application input is further based on each respective status of each filter setting of the one or more filter settings of the search results interface.

8. The method of claim 7, wherein causing the application to initialize performance of the search operation based on the application input includes:
causing the application to render a subset of application content that has been filtered according to each respective status of each filter setting of the one or more filter settings.

9. A method implemented by one or more processors, the method comprising:
receiving a spoken utterance that includes a request for an automated assistant of a computing device to perform a search of application content that is accessible via an interface of an application,
wherein the spoken utterance identifies one or more terms associated with the application content to be searched;
determining filtering features available to the application, for filtering the application content;
determining, based on the spoken utterance, whether the filtering features available to the application include one or more particular filtering features for filtering the application content according to the one or more terms identified in the spoken utterance;
when the application is determined to not provide the one or more particular filtering features:
identifying, based on the one or more terms, one or more filter parameters for submitting to the application in furtherance of performing the search of the application content,
causing the automated assistant to provide an application input to the application, wherein the application input identifies the one or more filter parameters, and
causing, based on the application input, the application to render search results, wherein the search results include a subset of the application content that satisfies the one or more filter parameters.

10. The method of claim 9, wherein the one or more particular filtering features include one or more selectable graphical user interface (GUI) elements that control one or more filtering operations of the application.

11. The method of claim 10, further comprising:
when the application is determined to provide the one or more particular filtering features:
causing the one or more selectable GUI elements to be selected to control the one or more filtering operations of the application.

12. The method of claim 9, further comprising:
when the application is determined to not provide the one or more particular filtering features:
identifying, based on the one or more filter parameters, one or more non-alphanumeric characters that are selected based on the one or more filter parameters,
wherein the application input identifies the one or more non-alphanumeric characters.

13. A computing device, comprising:
microphones;
a display interface;
memory storing instructions;
one or more processors operable to execute the instructions to:
- receive, via the microphones and while the display interface is rendering a search results interface of an application, a spoken utterance that is directed to an automated assistant that is accessible via the computing device, wherein the display interface includes one or more selectable GUI elements which establish one or more filter settings of the search result interface,
- determine, based on the spoken utterance, whether the user identified a particular filter setting that is not included in one or more filter settings of the search results interface; and
- when the automated assistant determines, based on the spoken utterance, that the user identified the particular filter setting that is not included in the one or more filter settings of the search results interface:
  - generate an application input that is based on application content of the search results interface and the spoken utterance, and
  - cause the application to initialize performance of a search operation based on the application input.

14. The computing device of claim 13, wherein the application input identifies the particular filter setting and identifies one or more search terms that correspond to the application content being rendered at the search results interface.

15. The computing device of claim 13, wherein the application input includes one or more terms included in the spoken utterance, and includes one or more search terms previously submitted to the application to cause the application content to be rendered at the search results interface.

16. The computing device of claim 13, wherein one or more of the processors are further operable to execute the instructions to:
- when the automated assistant determines, based on the spoken utterance, that the user identified the particular filter setting that is included in the one or more filter settings:
  - cause the particular filter setting of the application to be modified according to the spoken utterance from the user,
  - wherein modifying the particular filter setting causes different application content to be rendered at the search results interface.

17. The computing device of claim 13, wherein in causing the application to initialize performance of the search operation based on the application input one or more of the processors are to:
- incorporate the application input into a search field of the search results interface.

18. The computing device of claim 13, wherein in determining whether the user identified the particular filter setting that is not included in the one or more filter settings of the search results interface one or more of the processors are to:
- process assistant data that is based on one or more search interfaces previously rendered by the application or a different application.

19. The computing device of claim 13, wherein one or more of the processors are further operable to execute the instructions to:
- when the automated assistant determines that the user identified the particular filter setting that is not included in the one or more filter settings:
  - determine a respective status of each filter setting of the one or more filter settings of the search results interface,
  - wherein the application input is further based on each respective status of each filter setting of the one or more filter settings of the search results interface.

20. The computing device of claim 19, wherein in causing the application to initialize performance of the search operation based on the application input one or more of the processors are to:
- cause the application to render a subset of application content that has been filtered according to each respective status of each filter setting of the one or more filter settings.

* * * * *